Feb. 23, 1926.
P. M. GERFIN
1,574,283
PRUNING IMPLEMENT
Filed Nov. 22, 1924
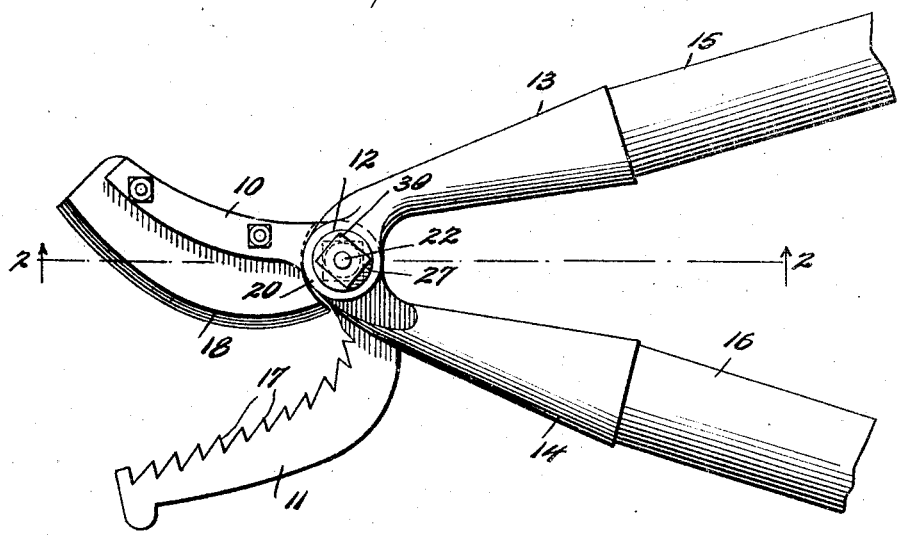
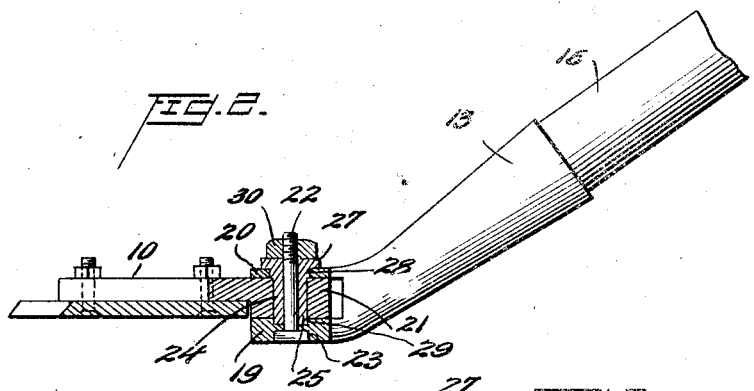
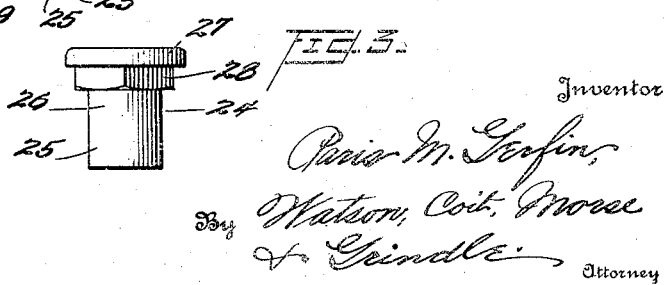
Inventor
Paris M. Gerfin,
By Watson, Coit, Morse
& Grindle.
Attorney Patented Feb. 23, 1926.

1,574,283

UNITED STATES PATENT OFFICE.

PARIS M. GERFIN, OF EAST PETERSBURG, PENNSYLVANIA.

PRUNING IMPLEMENT.

Application filed November 22, 1924. Serial No. 751,530.

*To all whom it may concern:*

Be it known that I, PARIS M. GERFIN, a citizen of the United States, residing at East Petersburg, county of Lancaster, State of Pennsylvania, have invented certain new and useful Improvements in Pruning Implements, of which the following is a specification.

This invention relates in general to pruning implements and more particularly to pruning implements of the shear type for cutting tobacco and other large stalks.

It is an object of this invention to provide a novel and improved pivot joint for pruning implements.

More particularly, it is an object of this invention to provide in a pruning shear a pivot bushing adjustable in position to compensate for wear.

A further object of the invention consists in the provision of a pivot joint for pruning shears which shall be more rigid in construction than the forms heretofore used and which will prevent separation of the blades due to the wedging action of an article being cut.

Pruning shears manufactured for use in cutting such large stalks as tobacco, are subject to considerable wear at the pivots, so that the blades are not held in proper relation to each other. It is then possible, due to this wear, that a small stalk may turn sideways and arrange itself between the two blades, forcing them apart so that the stalk is not cut but only serves to clog the shears. Further, the pivots wear largely in the direction of thrust, since the amount of rotation is slight and all of the thrust is in substantially the same direction at all times. The improved type of pivot joint is adapted to be used with any style of cutting implement, having a pair of pivoted blades arranged on the opposite side of the pivot from a pair of operating handles, but is particularly adapted to be applied to a pruning implement of the type disclosed in my prior Patent No. 882,781, patented March 24, 1908.

In the accompanying drawings and following specification is disclosed by way of example a single embodiment of the present invention, with the understanding however that various changes in form, size and proportion may be made in the various parts without departing from the spirit of the invention as set forth in the appended claims.

In said drawings:

Figure 1 is a plan view of the cutting end of a pruning implement;

Figure 2 is a vertical longitudinal section on the line 2—2 of Figure 1 looking in the direction of the arrows, and Figure 3 is a detailed elevation, on an enlarged scale, of the pivot bushing.

In the above mentioned patent, there is disclosed a pruning implement, somewhat similar to that shown in Figures 1 and 2 of the present application, with the exception of the style of pivot, which is the subject matter of the present invention. It comprises a pair of cooperating jaws 10 and 11 pivoted together at 12 and provided with the integral extensions 13 and 14, to which may be attached suitable handles 15 and 16, preferably formed of wood. The lower jaw 11 is offset materially from the handle 15 and extends substantially parallel thereto and is provided on its inner face with the ratchet-like teeth 17 for the purpose of retaining in position the stalk to be cut. The jaw 10 is provided with the cutting blade 18 suitably secured thereto and adapted to slide over the surface of the jaw 11 and with it constituting a shear for cutting large stalks.

To provide a firm pivot connection between the two members, the lower jaw 11 is provided at its pivotal point with the enlarged circular portion 19 formed integral therewith and connecting it to the part 13 supporting the handle. Directly above and parallel to this disk 19 is a similar thinner disk 20 formed integral with the part 13, the space between these two disks or furcations being just sufficient to accommodate the disk 21 formed between the jaw 10 and its extension 14. The disk 19 is bored to receive the pivot bolt 22 and is counterbored as at 23 to receive the square head of this bolt and allow it to be flush with the under surface of the disk, the square head being prevented from rotating by cooperating with the sides of the square counter-bore.

The disks 20 and 21 are bored to receive the hollow pivot bushing 24, which is best shown in Figure 3, and comprises the sleeve portion 25 having a cylindrical outer surface 26; the flanged head 27; and the intermediate portion 28 being preferably polygonal in form. It is preferred to provide this portion 28 with four equal sides, as shown in the figure, adapted to fit within a correspondingly shaped hole in the disk 20 to prevent the bushing from rotating. The lower end of the bushing is adapted to fit within a counter-bore 29 in the lower disk 19, so that the bushing is substantially supported against movement in any but an axial direction between the disks 19 and 20 and snugly engages the walls of the bore in the disk 21 to thus provide a journal upon which the jaw 10 may pivot. The flanged head 27 of the bushing rests on top of the disk 20 so that when the pivot bolt 22 is placed in position and the nut 30 tightened thereon, the two disks 19 and 20 cannot be drawn up to bind with the corresponding faces of the disk 21, but are maintained in their proper spaced relation owing to the lower end of the bushing 24 abutting against the bottom of the counter-bore 29.

With the construction just described, it will be evident that the bushing 24 is effectively prevented from rocking in the jaw 11 so that the two blades of the device cannot separate on an axis at right angles to the axis of the pivot. Furthermore, all of the wear on the bushing, which is substantially in the direction of the dotted line shown in Figure 1 and upon the outside of the bushing, can be taken up by the simple procedure of loosening the nut 30, lifting the bushing until its portion 28 is disengaged from the walls of the aperture in the disk 20 and rotating this bushing a portion of a turn, i. e., one-fourth in the present disclosure, to position it with a new surface adapted to take the wear and thrust of cutting. The life of the bushing is thus materially increased and satisfactory operation of the shears insured for a much longer period. Of course, a new bushing can readily be put in place of the old when it is completely worn out after having been rotated through the full turn. By providing means for preventing rotation of the bushing, there is no tendency for the nut 30 to loosen upon the pivot bolt 22, and hence no means need be provided for locking it in place. This nut can also be drawn up very tight to further insure its remaining in position, since such tightening has no tendency to cause any binding between the two jaws of the shear owing to the previously described action of the bushing 24 in maintaining the disks 19 and 20 separated.

Having thus described my invention, what is claimed as new and desired to be secured by U. S. Letters Patent is:

1. A pruning implement including in combination, two pivoted jaws, each provided with a handle, and adapted to move in parallel planes, a projection on the lower jaw having a bearing surface resting on the upper one, and a bushing passing through said projection, said upper jaw and into said lower jaw.

2. A pruning implement including in combination, two jaws pivoted together, each provided with a handle, said jaws lying in parallel planes, a projection on the lower jaw overlapping the upper one, a bushing passing through said projection, said upper jaw and into said lower jaw, and a pivot bolt retaining said bushing in place.

3. A pruning implement including in combination, two pivoted overlying jaws, each provided with a handle, one of said jaws having an enlargement at the pivot point, a projection on the other jaw extending over said enlargement, and a bushing passing through said projection, said enlargement and into said other jaw, said bushing having means thereon to prevent its rotation.

4. A pruning implement including in combination, a pair of crossed jaws pivoted together to operate in parallel planes, each jaw having an enlargement at the pivoted portions, the lower jaw being provided with an integral disk, between which and the main enlarged portion the enlargement of the upper jaw fits, a bushing supported between said disk and lower jaw providing a pivot for said upper jaw, and means on said bushing to maintain said disk and jaw spaced apart to prevent binding.

5. A pruning implement including in combination, a pair of crossed jaws pivoted together to operate in parallel planes, each jaw having an enlargement at the pivoted portions, the lower jaw being provided with an integral disk, between which and the main enlarged portion the enlargement of the upper jaw fits, a bushing supported between said disk and lower jaw providing a pivot for said upper jaw, said disk having a polygonal hole, and a similar shaped enlargement on said bushing to engage the walls of said hole to prevent rotation of said bushing.

6. A pivot bearing for pruning implements including in combination, a bifurcated jaw member, another jaw member adapted to fit between the furcations, a bushing supported in said furcations and forming a pivot for said second jaw member, a pivot bolt non-rotatively mounted in one of said furcations and serving to retain said bushing in place, and means on said bushing cooperating with one of said furcations to allow adjustment thereof to present new wearing surfaces.

7. A pivot bearing for pruning implements including in combination, a bifurcated jaw member, another jaw member adapted to fit between the furcations, a bushing supported in said furcations spacing them apart and forming a pivot for said second jaw member, a pivot bolt nonrotatively mounted in one of said furcations and serving to retain said bushing in place, and means on said bushing cooperating with one of said furcations to allow adjustment thereof to present new wearing surfaces.

In testimony whereof I hereunto affix my signature.

PARIS M. GERFIN.